(12) United States Patent
Lee

(10) Patent No.: US 6,240,420 B1
(45) Date of Patent: May 29, 2001

(54) CUSTOMER SUPPORT SEARCH ENGINE SYSTEM AND METHOD OF SEARCHING DATA USING THE SEARCH ENGINE SYSTEM

(75) Inventor: Kang-dong Lee, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/144,416

(22) Filed: Aug. 31, 1998

(30) Foreign Application Priority Data

Aug. 30, 1997 (KR) ................................. 97/44414

(51) Int. Cl.[7] .............................. G06F 17/30; G06F 12/60
(52) U.S. Cl. .......................... 707/102; 707/10; 707/104; 709/203; 709/219; 345/340; 345/352; 345/356; 705/26
(58) Field of Search ................................. 705/26; 707/10, 707/104, 102; 345/336–338, 968, 340, 356, 352; 709/203, 219

(56) References Cited

U.S. PATENT DOCUMENTS

| | | | |
|---|---|---|---|
| 5,123,086 | 6/1992 | Tanaka et al. ...................... | 395/155 |
| 5,179,695 | 1/1993 | Derr et al. ........................... | 395/575 |
| 5,263,167 * | 11/1993 | Conner, Jr. ......................... | 395/700 |
| 5,301,314 | 4/1994 | Gifford et al. ...................... | 395/600 |
| 5,367,667 | 11/1994 | Wahlquist et al. .................. | 395/575 |
| 5,432,902 * | 7/1995 | Matsumoto ......................... | 395/156 |
| 5,469,498 | 11/1995 | Abe et al. ............................ | 379/127 |
| 5,613,150 | 3/1997 | Yamada ............................... | 395/800 |
| 5,623,652 * | 4/1997 | Vora .................................... | 395/610 |
| 5,628,011 * | 5/1997 | Ahamed ............................... | 395/610 |
| 5,634,048 * | 5/1997 | Ryu ..................................... | 395/610 |
| 5,675,784 * | 10/1997 | Maxwell .............................. | 395/611 |
| 5,678,002 | 10/1997 | Fawcett et al. ................. | 395/183.01 |
| 5,694,559 | 12/1997 | Hobson et al. ...................... | 395/336 |
| 5,745,675 | 4/1998 | Herbig et al. ................... | 395/183.14 |
| 5,745,681 * | 4/1998 | Levine .............................. | 395/200.3 |
| 5,781,191 | 7/1998 | Mayuzumi et al. ................. | 345/336 |
| 5,909,023 * | 6/1999 | Ono ..................................... | 235/380 |
| 5,918,214 * | 6/1999 | Perkowski ............................ | 705/27 |
| 5,950,173 * | 9/1999 | Perkowski ............................ | 705/26 |
| 5,983,369 * | 11/1999 | Bakoglu ............................... | 714/46 |
| 6,028,601 * | 2/2000 | Machiraju ........................... | 345/336 |

* cited by examiner

*Primary Examiner*—John Breene
*Assistant Examiner*—David J. Robinson
(74) *Attorney, Agent, or Firm*—Robert E. Bushnell, Esq.

(57) ABSTRACT

A customer support search engine system and a method of searching data using the system includes: a product model database for storing information on product models of a computer of a customer, each product model information including a first field including the names of product models and a second field including the names of devices constituting the product models, each device name including a pointer which indicates a path for providing information where detailed data with respect to the device is stored; a device database for storing information on devices constituting the product models, by the product models, the information on the devices consisting of a device field including the device names and a data field storing detailed data about the devices included in the device field; a user interface for displaying predetermined customer support items in a menu form enabling selection by a user and allowing a user to select the customer support items and input character or numerical data through a keyboard, in order to effect the customer support; and a search engine connected to the user interface and the product model database and the device database, the search engine searching the product model database and the device database upon input data of a user being input through the user interface and outputting corresponding data.

15 Claims, 7 Drawing Sheets

| 500 | 510 |
|---|---|
| M 550 D | MEMORY, HDD, MODEM, VIDEO CARD ··· |
| M 550 T | MEMORY, HDD, MOUSE, CD-ROM, ··· |
| SENS 500 | MEMORY, HDD, CPU, BIOS, ··· |
| ⋮ | ⋮ |

FIG. 6

| | |
|---|---|
| CPU | [F] CPU UPGRADING METHOD<br>CPU OPTIONS<br>COMPATIBILITY |
| HDD | HDD INSTALLATION METHOD<br>[F] HDD POSSIBILITY OF HDD<br>ADDITIONAL EXPANSION |
| VIDEO | [D] m500d_vi_zip<br>[F] OPTION OF VIDEO BOARD<br>COMPARISON OF BASIC<br>OPTION OF VIDEO BOARD |
| ⋮ | ⋮ |

CUSTOMER SUPPORT SEARCH ENGINE SYSTEM AND METHOD OF SEARCHING DATA USING THE SEARCH ENGINE SYSTEM

CROSS-REFERENCE TO RELATED APPLICATIONS

This application is related to co-pending U.S. application Ser. No. 08/079,305, filed in the U.S. application Ser. No. 09/079,305, filed in the U.S. Patent & Trademark Office on May 15, 1998 and bearing common inventorship to that of the present application.

CLAIM OF PRIORITY

This application makes reference to, incorporates the same herein, and claims all benefits accruing under 35 U.S.C. §119 from an application for CONSUMER SUPPORT SEARCH ENGINE SYSTEM AND METHOD FOR SEARCHING DATA THEREOF earlier filed in the Korean Industrial Property Office on the 30$^{th}$ of Aug. 1997 and there duly assigned Ser. No. 44414/1997.

BACKGROUND OF THE INVENTION

1. Field of the Invention

The present invention relates to a search engine system, and more particularly, to a customer support search engine system which is used with a Web server for effecting customer service on a customer's computer using the Internet and providing technical information on the customer's computer for the customer, and a method of searching data using the search engine system.

2. Description of Related Art

In general, a customer requests customer service when defects occur in a purchased product while its being used, or when they have something to ask. Then, a service person from a service center or an external service employee visits the customer to solve his problem.

Accordingly, trouble can occur since even a simple problem must be solved by the service person's visiting the customer in person. Also, such a personal visit impedes rapid customer service, and labor costs to the service person or external service employee must be paid. In particular, when customer service is needed for a computer, development engineers are often requested to provide such a repair service by telephone since the customer service person cannot always solve computer problems.

Therefore, establishment of a rapid service system and curtailment of customer service expenses appear as significantly important matters to marketing companies selling products, in association with an increasing market quality issue.

A customer support system using the Internet includes a customer support server connected to the Internet via an Internet host, and a user's computer which can be connected to the customer support server via the Internet using an Internet communications unit such as a modem.

The user's computer, which may be a PC which can be connected to the Internet using a typical Internet connecting device, such as a modem or a leased circuit, can receive necessary customer service by connecting to the customer support server via the Internet. The customer support server adopts a computer as a server which includes a customer support engine for providing customer support service and a data base for systematically storing PC related information required by the customer support engine. The customer support engine includes software for customer support and consists of a gate page which corresponds to a homepage, a user's guide page, a download page, an FAQ page and a Windows 95 page.

In the customer support system using the Internet and having such a configuration, when the user's computer wants to search for desired data through the customer support server, if a search engine system for performing the above search is provided, customer support can be more effectively performed. The search engine system must be able to provide useful information more rapidly when it is convenient for a customer to use the information.

The following patents disclose some features in common with the present invention: U.S. Pat. No. 5,367,667 to Wahlquist et al., entitled System For Performing Remote Computer System Diagnostic Tests, U.S. Pat. No. 5,694,559 to Hobson et al., entitled On-Line Help Method And System Utilizing Free Text Query, U.S. Pat. No. 5,301,314 to Gifford et al., entitled Computer-Aided Customer Support System With Bubble-Up, U.S. Pat. No. 5,123,086 to Tanaka et al., entitled Method And System Of Hierarchical Assistance, U.S. Pat. No. 5,678,002 to Fawcett et al., entitled System And Method For Providing Automated Customer Support, U.S. Pat. No. 5,179,695 to Derr et al., entitled Problem Analysis Of A Node Computer With Assistance From A Central Site, U.S. Pat. No. 5,745,675 to Herbig et al., entitled Object Oriented Framework Mechanism For Performing Computer System Diagnostics, U.S. Pat. No. 5,613,150 to Yamada, entitled Apparatus For Producing Operational Manual, U.S. Pat. No. 5,469,498 to Abe et al., entitled Post-Delivery Support System For Private Branch Exchanges, and U.S. Pat. No. 5,781,191 to Mayuzumi et al., entitled Method And Apparatus For Reproducing Operation Guidance Information And Method And Apparatus For Reproducing Multi-Media Information.

SUMMARY OF THE INVENTION

An object of the present invention is to provide a customer support search engine system which can be usefully utilized for a customer support system using the Internet.

Another object of the present invention is to provide a method of searching data, in the customer support search engine system.

To accomplish the first object, there is provided a customer support search engine system comprising: a product model database which stores information on product models of a computer purchased by a customer, each product model information group comprising of a first field including the names of product models and a second field including the names of devices constituting the product models, each device name including a pointer which indicates a path for providing information where detailed data with respect to the device is stored; a device database which stores information on devices constituting the product models, by the product models, the information on the devices consisting of a device field including the device names and a data field storing detailed data about the devices included in the device field; a user interface which displays predetermined customer support items in a menu form enabling selection by a user and allowing a user to select the customer support items and input character or numerical data through a keyboard, in order to accomplish the customer support; and a search engine which is connected to the user interface and the product model database and the device database, which searches the product model database and the device database if input data of a user is input through the user interface, and which outputs corresponding data.

It is preferable that the data field in the device database comprise: a user's guide module for storing information on the usages of the devices; an FAQ module for storing information on questions frequently asked with respect to the devices and answers to these questions; and a download module for storing downloadable programs that are required by customers, and wherein the search engine searches the device database and outputs corresponding information of the data field.

Also, preferably, the customer support item of the user interface is at least comprised of the names of product models, the names of devices constituting the product models, and items wanted by a predetermined user with respect to the devices.

The user wanted item comprises at least one of: a user's guide for providing information on the usages of the devices; an FAQ for providing questions often raised with respect to the devices and answers to these questions; and a download area for providing downloadable programs that are required by customers.

To accomplish the second object, there is provided a method of searching data using the customer support search engine system, comprising the steps of: displaying a product model name menu window for selecting one of product model names, a device name menu window for selecting a device name corresponding to the selected product model, and a customer selection item menu window consisting of a user's guide, an FAQ of frequent questions and answers, and a download area for downloading necessary programs; searching the product model database if a product model name is selected from the product model name menu window to determine a corresponding product model; displaying a menu window for showing the names of devices constituting a product model selected from the product model menu window, and searching the device database if a device name is selected, to determine a corresponding device; and displaying the customer selection menu window, and if the customer selection item is selected, searching the device database to output data corresponding to the product model name, the device name and the customer selection item that have been determined.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
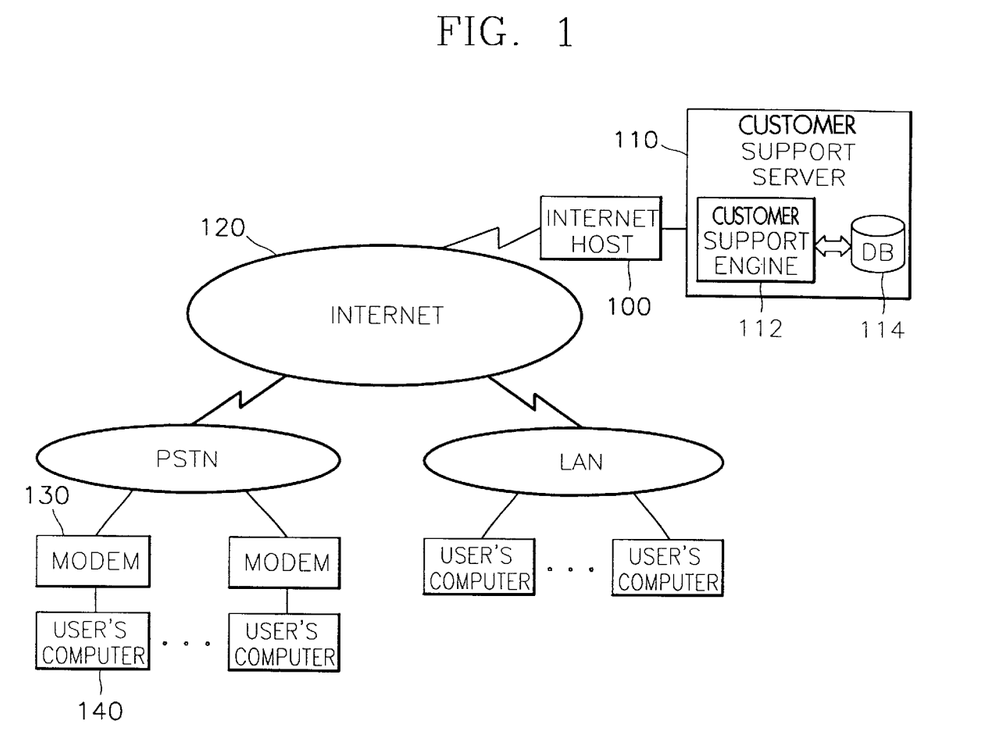
FIG. 1 is a block diagram showing the entire configuration of a customer support system using the Internet.

FIG. 1 is a block diagram showing the entire configuration of a customer support system using the Internet. The customer support system includes a customer support server 110 connected to the Internet 120 via the Internet host 100, and a user's computer 140 which can be connected to the customer support server 110 via the Internet 120 using an Internet communications unit such as a modem 130.

Figure 2:
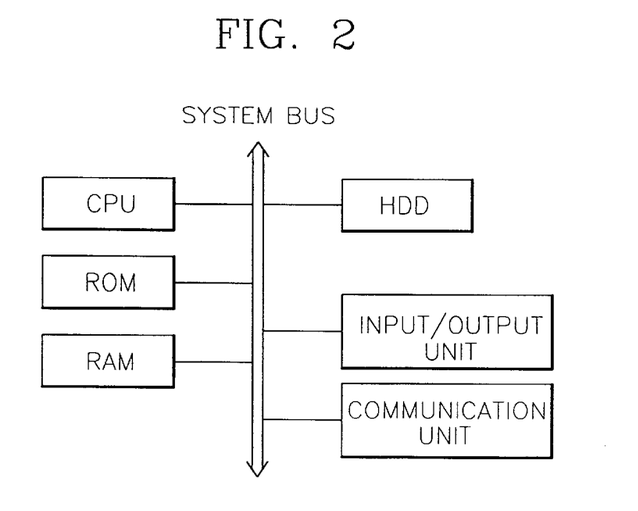
FIG. 2 is a block diagram showing the configuration of a computer system.
Figure 3:
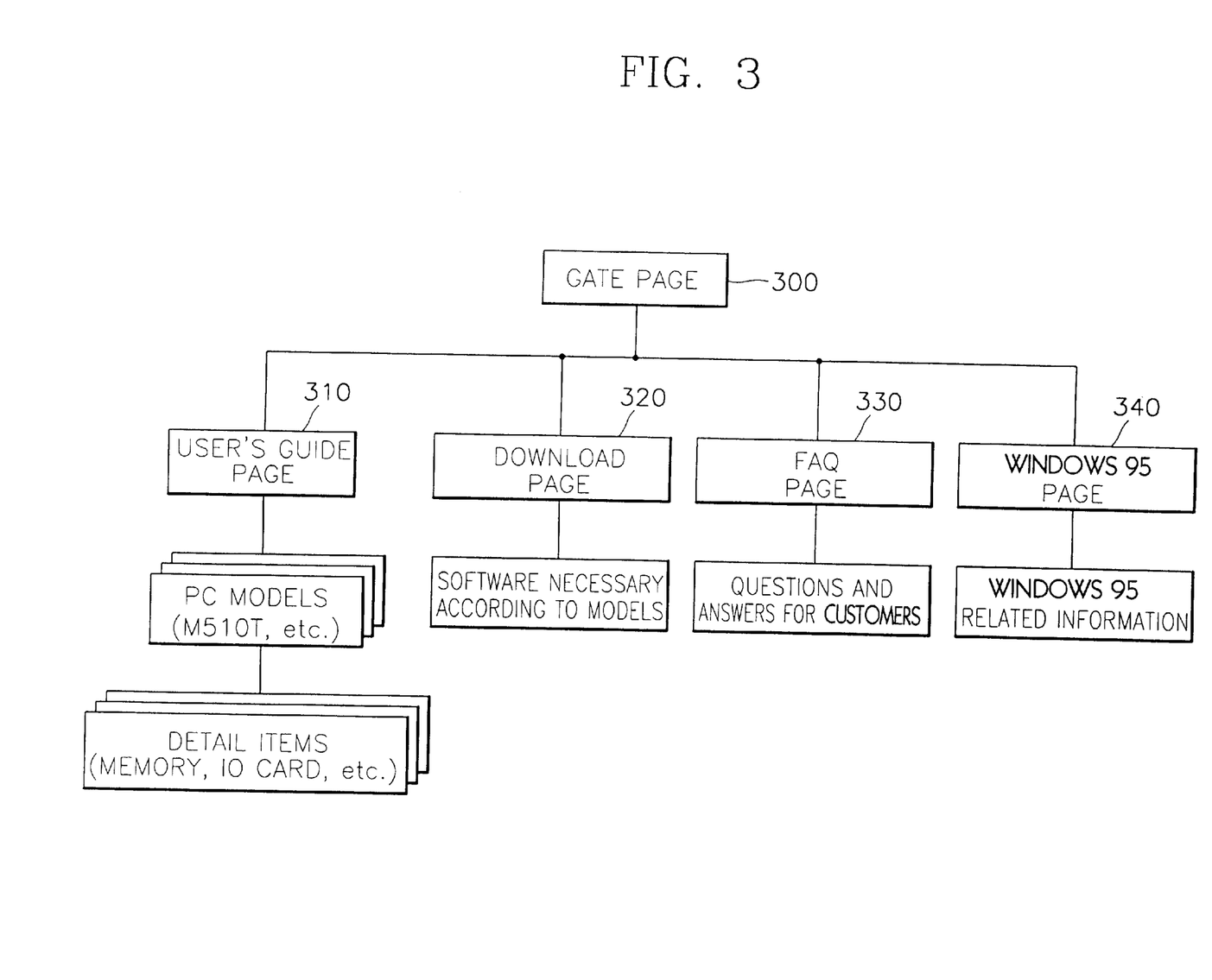
FIG. 3 is a block diagram showing the function of a customer support engine.

The user's computer 140 denotes a customer with a PC which can be connected to the Internet 120 using a typical Internet connecting device, such as a modem or a leased circuit, and which can receive necessary customer service by connecting to the customer support server 110 via the Internet. The customer support server 110 adopts a computer as shown in FIG. 2 as a server, and includes a customer support engine for providing customer support service and a database for systematically storing PC-related information required by the customer support engine. The customer support engine 112 denotes software for customer support, and consists of a gate page 300 which corresponds to a homepage, as shown in FIG. 3, a user's guide page 310, a download page 320, an FAQ page 330 and a Windows 95 page 340.

In the customer support system using the Internet and having such a configuration, when the user's computer 140 wants to search for desired data through the customer support server 110, if a search engine system for performing the above search is provided, customer support can be more effectively performed. The search engine system must be able to provide useful information more rapidly when it is convenient for a customer to use the information.

Figure 4:
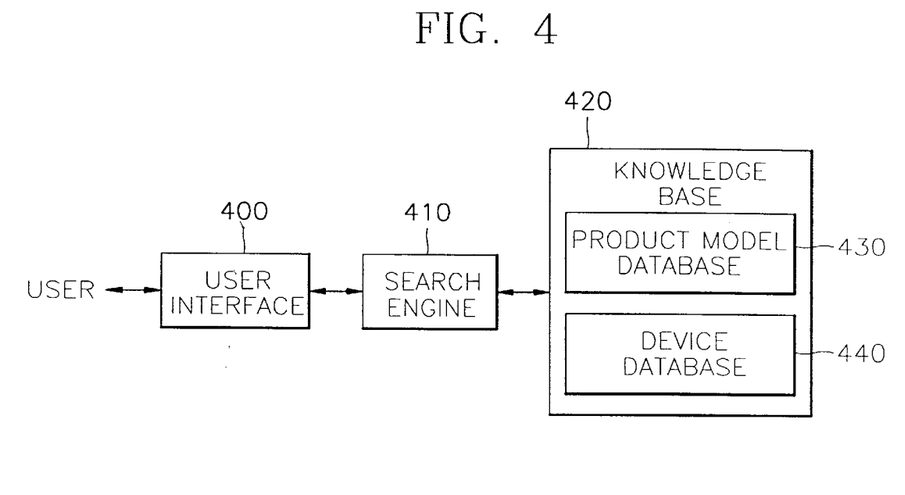
FIG. 4 is a,block diagram showing the configuration of a preferred embodiment of the present invention.

Referring to FIG. 4, a customer support system according to a preferred embodiment of the present invention is comprised of a knowledge base 420, a user interface 400 and a search engine 410. The knowledge base 420 stores knowledge about a computer purchased by a customer, and is comprised of a product model database 430 and a device database 440.

Figure 5:
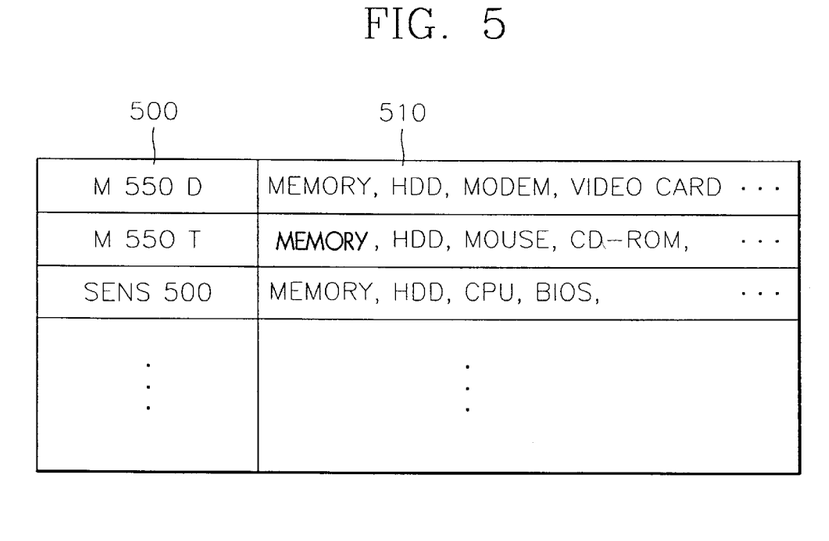
FIG. 5 shows the configuration of data of product model information.

The product model database 430 stores information on product models for a computer purchased by a customer. Information of each of the product models is comprised of a first field 500 representing the names of product models, and a second field 510 representing the names of devices constituting each of the product models, as shown in FIG. 5. Also, each device name includes a pointer which indicates a path for providing information as to where detailed data with respect to each of the devices is stored. If a device name is searched, then data of the corresponding device stored in the device database 440 is accessed through the pointer.

Figure 6:
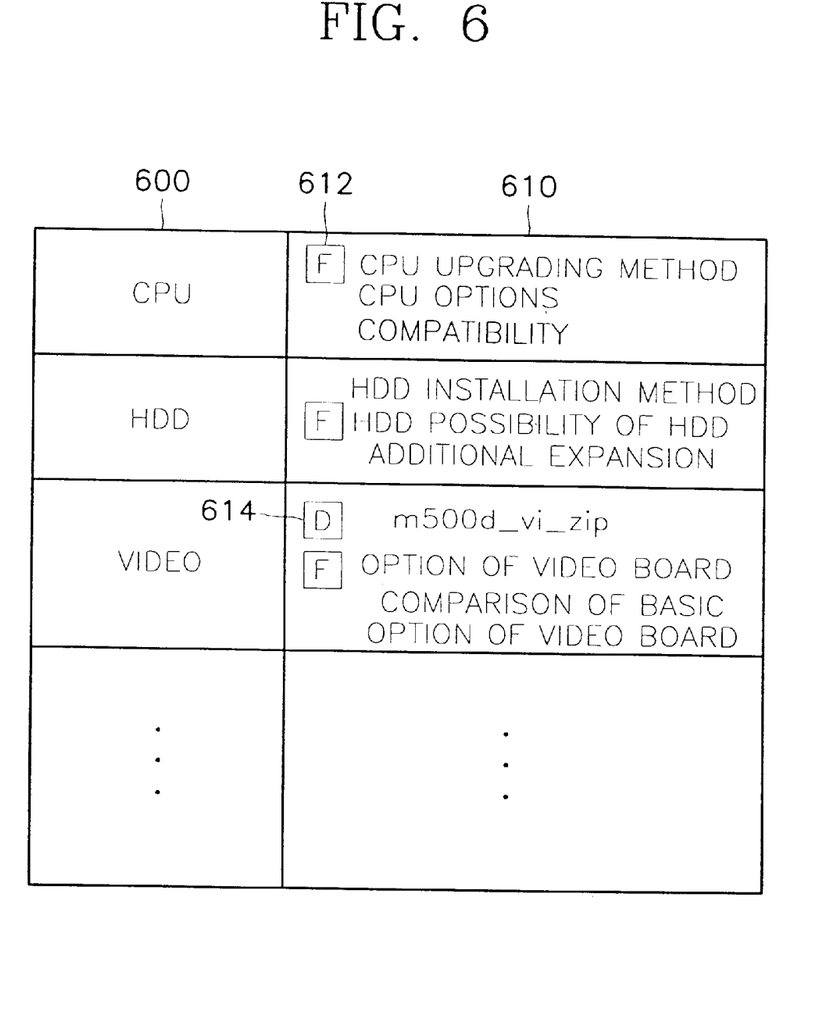
FIG. 6 shows the configuration of data of device information.

The device database 440 stores information on the devices constituting the product models, respectively, by the product models. As shown in FIG. 6, the information on the devices is comprised of a device field 600, which indicates the names of devices, and a data field 610, which stores detailed data with respect to the devices included in the device field. The device includes hardware and software that have been installed or can be installed in the product models. The data field 610 includes at least one of a user's guide module for storing information on the usages of the devices, an FAQ module for storing information on questions frequently asked in association with the devices and answers to the questions, and a download module for storing downloadable programs which are required by customers. That is, if data stored in the data field 610 is data about questions and answers, a flag F 612 indicates that the data is included in the FAQ module. Also, if the content of the data field 610 is a program to be downloaded, a flag D 614 indicates that the data is involved in the download module. Data without the flag is included in the user's guide module.

The user interface 400 displays predetermined customer support items in a menu form to allow a user to select one of them, for customer support, and allows a user to select one of the customer support items or input character or numerical data through a keyboard. The customer support item described above consists of a product model name, a name of a device constituting the product model, and an item desired by a user with respect to the device.

The user's desired item includes at least one of user's guide information corresponding to information on the usages of the devices, FAQ information corresponding to questions often asked with respect to the devices and answers to the questions, and download information corresponding to downloadable programs which are required by customers.

Figure 7:
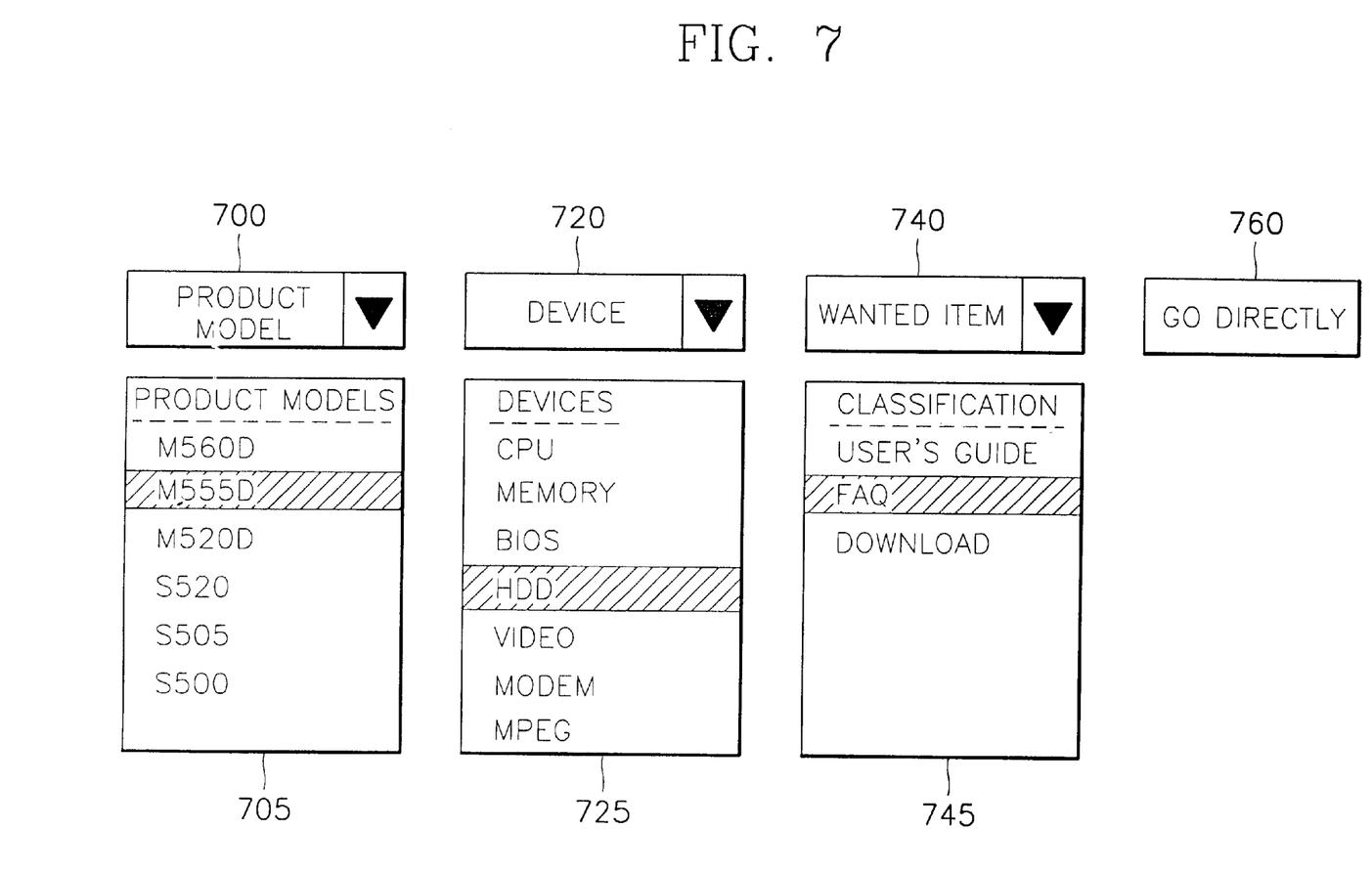
FIG. 7 shows menu windows for product model names, devices' names, and user's desired items.

The search engine 410 is connected to the user interface 400, the product model database 430 and the device database 440. If input data of a user is input via the user interface 400, for example, if a product model name is selected, a corresponding device name is selected, a user's desired item (e.g., FAQ) is selected, and a 'go directly' button 760 is clicked. The search engine 410 searches the product model database 430 and the device database 440, and then outputs corresponding data which is suitable to the above conditions.

Figure 8A:
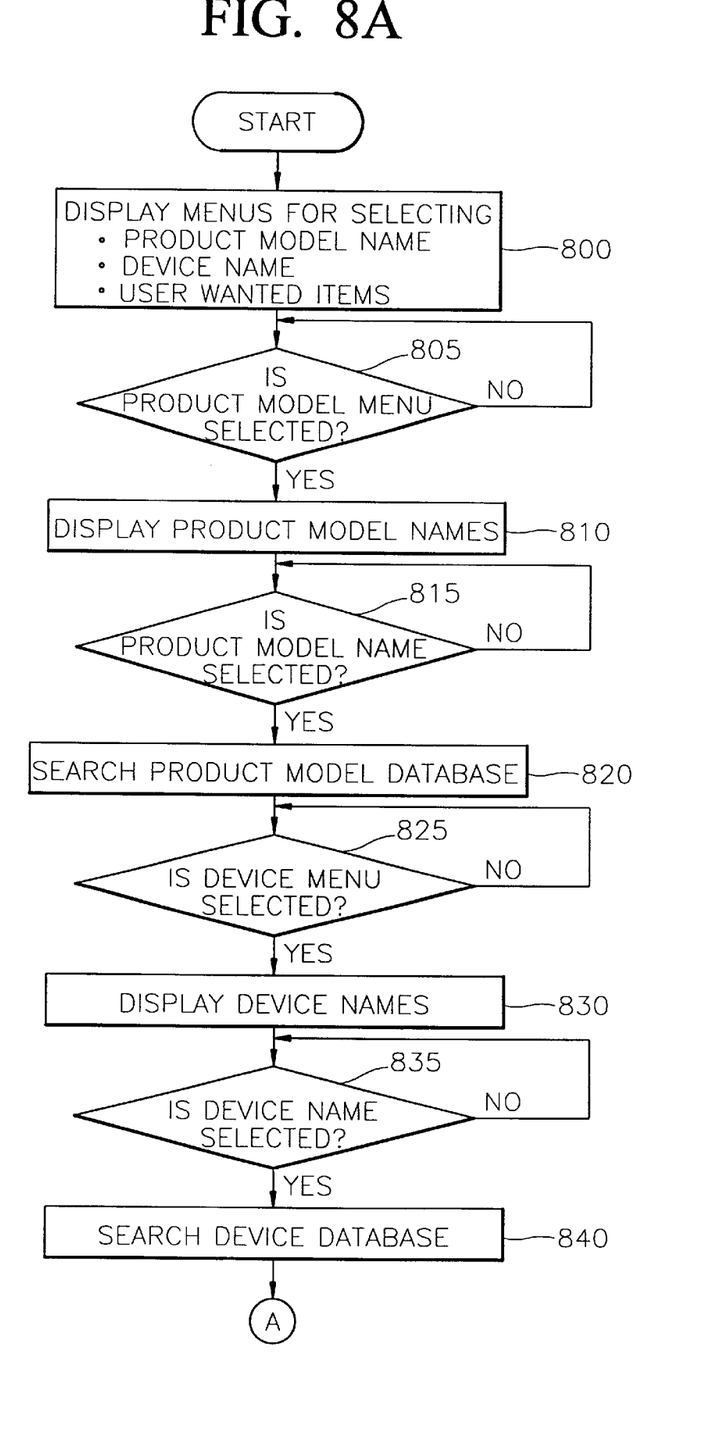
FIGS. 8A–8B together form a flowchart for illustrating a method of searching data in a customer support search engine system.
Figure 8B:
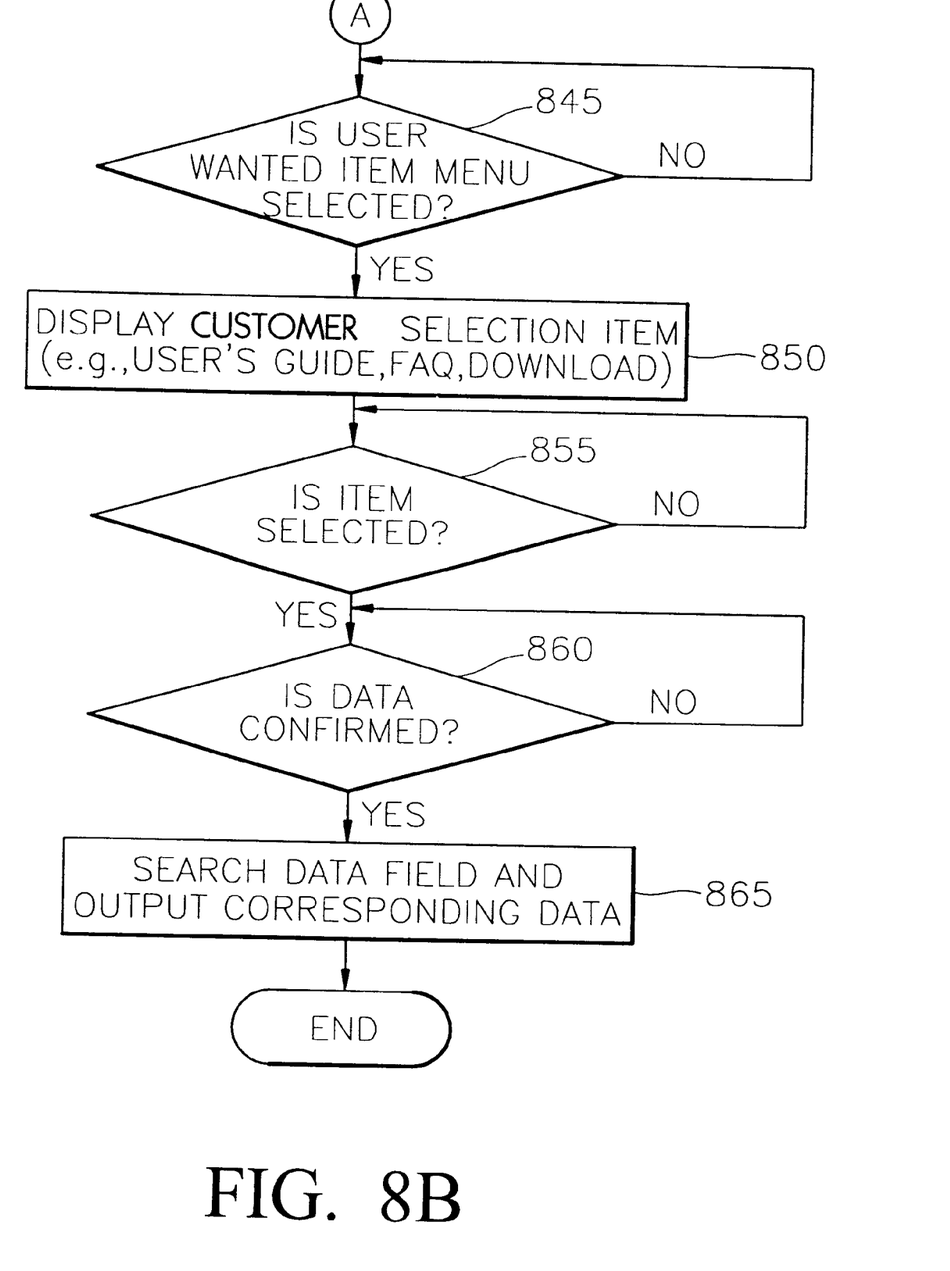

Hereinbelow, a method of searching data of the customer support search engine system on the basis of the above configuration can be described referring to FIGS. 8A–8B. FIGS. 8A–8B is a flowchart illustrating a method of searching data of the customer support search engine system.

First, in order to obtain data wanted by a user, menu screens for showing product model names, device names and user wanted items, respectively, are displayed as shown in FIG. 7, in step 800 of FIG. 8A.

If a product model menu window 700 is clicked from the displayed menu screens in step 805, product model names 705 are displayed in step 810. If a user selects one of the displayed product model names in step 815, the product model database 430 is searched in step 820.

If the user selects the device menu window 720 in step 825, device names 725 corresponding to the selected product model are displayed in step 830. If the user selects one of the displayed device names in step 835, the device database 440 is searched in step 840.

If the user wanted item (consumer selection item) menu window 740 is selected in step 845 of FIG. 8B, customer selection items (i.e., a user's guide item, an FAQ item and a download item) 745 are displayed in step 850. If the user selects one of the displayed customer selection items in step 855, and then if the data is confirmed by clicking the go directly button 760 in step 860, the data field 610 of the device database 440 is searched, corresponding data is output, and the data search is then concluded, in step 865. Note that step 845 of clicking the customer selection item menu window 740 may be performed before step 805 of clicking the product model menu window 700.

According to the present invention, in a customer support system using the Internet, user wanted information is classified into a product name item, a device name item and an item which is required by a user with respect to wanted information. Therefore, the present invention provides a convenient interface to the user, and can be effectively utilized in the customer support system which provides customer wanted information through the Internet.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A customer support search engine system utilized in a web server for customer service on a computer of a customer using the Internet and providing technical information on the computer to the customer, said system comprising:

a product model database for storing information on product models of computers of customers, each product model information group comprising a first field including the names of product models and a second field including the names of devices constituting said product models, each device name including a pointer which indicates a path for providing information as to where detailed data with respect to said device is stored;

a device database for storing, by product model, information on devices constituting said product models, said information on said devices comprising a device field including said device names and a data field for storing detailed data about the devices included in said device field;

a user interface for displaying predetermined customer support items in a menu form enabling selection by a user, and allowing the user to select said customer support items and input character or numerical data through a keyboard, in order to effect said customer support; and a search engine connected to said user interface, said product model database and said device database, said search engine searching said product model database and said device database upon input data of the user being input through said user interface, and said search engine outputting corresponding data.

2. The customer support search engine system of claim 1, said device field comprising software and hardware installed in said product model.

3. The customer support search engine system of claim 2, said data field in said device database comprising:

a user's guide module for storing information on the usages of said devices;

a frequently asked question (FAO) module for storing information on frequently asked questions with respect to said devices and answers to these questions; and a download module for storing downloadable programs that are required by customers;

said search engine searching said device database and outputting corresponding information of said data field.

4. The customer support search engine system of claim 3, said customer support items of said user interface comprising the names of product models, the names of devices constituting said product models, and items wanted by users with respect to said devices.

5. The customer support search engine system of claim 4, said items wanted by said users comprising at least one of:

a user's guide for providing information on the usages of said devices;

an FAQ for providing questions often asked with respect to said devices and answers to said questions; and a download area for providing downloadable programs required by customers.

6. A method of searching data using said customer support search engine system utilized in a web server for effecting a customer service on a computer of a customer using an Internet and providing technical information on the computer to said customer, said customer support search engine system including a product model database for storing information on product models of computers of said customers, and a device database for storing information by product model on devices constituting said product models, said method comprising the steps of:

displaying a product model name menu window for selecting one of said product model names;

searching said product model database, upon a product model name being selected from said product model name menu window, to determine a corresponding product model;

displaying a device name menu window for showing names of devices constituting the product model selected from said product model name menu window, and searching said device database, upon a device name being selected, to determine a corresponding device; and displaying a customer selection item menu window and, upon a customer selection item being selected, searching said device database to output data corresponding to said product model name, said device name and said customer selection item that have been selected;

wherein said customer selection item menu window displays items for selection including a user's guide item, a frequently asked question (FAQ) item, and a programs for download item.

7. The customer support search engine system of claim 1, said device field comprising software and hardware installable in said product model.

8. The customer support search engine system of claim 1, said data field in said device database comprising:

a user's guide module for storing information on the usages of said devices;

a frequently asked question (FAQ) module for storing information on frequently asked questions with respect to said devices and answers to these questions; and a download module for storing downloadable programs that are required by customers;

said search engine searching said device database and outputting corresponding information of said data field.

9. The customer support search engine system of claim 8, said customer support items of said user interface comprising the names of product models, the names of devices constituting said product models, and items wanted by users with respect to said devices.

10. The customer support search engine system of claim 9, said items wanted by said users comprising at least one of:

a user's guide for providing information on the usages of said devices;

an FAQ for providing questions often asked with respect to said devices and answers to said questions; and a download area for providing downloadable programs required by customers.

11. The customer support search engine system of claim 1, said customer support items of said user interface comprising the names of product models, the names of devices constituting said product models, and items wanted by users with respect to said devices.

12. The customer support search engine system of claim 11, said items wanted by said users comprising at least one of:

a user's guide for providing information on the usages of said devices;

an FAQ for providing questions often asked with respect to said devices and answers to said questions; and a download area for providing downloadable programs required by customers.

13. The customer support search engine system of claim 1, wherein said corresponding data outputted by said search engine comprises:

a user's guide for providing information on the usages of said devices;

an FAQ for providing questions often asked with respect to said devices and answers to said questions; and a download area for providing downloadable programs required by customers.

14. The method of claim 6, further comprising the step of outputting, to the computer of the customer, data corresponding to selections made by the customer.

15. The method of claim 14, wherein said corresponding data outputted to the computer of the customer comprises:

a user's guide for providing information on the usages of said devices;

an FAQ for providing questions often asked with respect to said devices and answers to said questions; and a download area for providing downloadable programs required by customers.

* * * * *